United States Patent [19]
Montgomery

[11] Patent Number: 5,551,825
[45] Date of Patent: Sep. 3, 1996

[54] LIVE BOTTOM SHEAR DECK REFUSE BAG OPENER

[75] Inventor: James R. Montgomery, Portland, Oreg.

[73] Assignee: Beloit Technologies, Inc., Wilmington, Del.

[21] Appl. No.: 321,365

[22] Filed: Oct. 11, 1994

[51] Int. Cl.⁶ .................................. B65G 65/00
[52] U.S. Cl. .................. 414/412; 209/693; 209/930; 241/200; 241/DIG. 38
[58] Field of Search .................. 414/412; 209/693, 209/930; 241/200, 202, DIG. 38

[56] References Cited

U.S. PATENT DOCUMENTS

| | | | |
|---|---|---|---|
| 3,886,951 | 6/1975 | McRobert | 209/693 X |
| 3,891,105 | 6/1975 | Cerroni | 414/412 |
| 4,067,506 | 1/1978 | Cerroni | 241/200 |
| 4,119,227 | 10/1978 | Hafner et al. | 414/412 |
| 4,341,353 | 7/1982 | Hamilton et al. | 241/DIG. 38 X |
| 4,479,581 | 10/1984 | Kelyman, Jr. | 241/DIG. 38 X |
| 4,515,509 | 5/1985 | Frisz | 414/412 |
| 4,566,641 | 1/1986 | Okamoto et al. | 241/200 |
| 4,610,545 | 9/1986 | Tomlinson | 241/200 X |
| 4,798,508 | 1/1989 | Lewis | 414/412 |
| 4,846,975 | 7/1989 | Kelyman | 210/603 |
| 5,101,977 | 4/1992 | Roman | 209/930 X |
| 5,188,500 | 2/1993 | Eide et al. | 414/412 |
| 5,253,971 | 10/1993 | Weinlader | 414/412 |
| 5,269,474 | 12/1993 | Reis et al. | 241/200 X |
| 5,282,713 | 2/1994 | Lande | 414/412 |
| 5,368,432 | 11/1994 | Schoenhard | 209/930 X |
| 5,370,234 | 12/1994 | Sommer, Jr. et al. | 209/930 X |

FOREIGN PATENT DOCUMENTS

| | | |
|---|---|---|
| 0563002 | 3/1993 | European Pat. Off. . |
| 1432564 | 11/1964 | France . |
| 2307634 | 4/1976 | France . |
| 1297550 | 6/1969 | Germany . |
| 2556044 | 6/1976 | Germany . |
| 0556176 | 1/1980 | Japan . |
| 61-33644 | 2/1986 | Japan . |
| 8303265 | 9/1983 | Netherlands . |
| 0628035 | 10/1978 | U.S.S.R. . |
| 0825379 | 4/1981 | U.S.S.R. . |
| 1013356 | 4/1983 | U.S.S.R. . |
| 1127814 | 12/1984 | U.S.S.R. ............... 414/412 |
| 1244033 | 7/1986 | U.S.S.R. ............... 414/412 |
| 1535305 | 12/1978 | United Kingdom . |
| 2062497 | 11/1979 | United Kingdom . |

Primary Examiner—David A. Bucci
Attorney, Agent, or Firm—Dirk J. Veneman; Raymond W. Campbell

[57] ABSTRACT

A plurality of parallel chain loops have outwardly extending blades and travel in plastic channels over an inclined deck. The chains extend between shafts which rotate in opposite directions and are mounted to the shafts so that alternating chains move up the incline and the others move down. Refuse bags deposited on the deck are torn open by the blades. Small refuse objects fall between the chains and slide down the deck to be discharged, while larger objects are carried by the upwardly moving chains to the top of the deck. Refuse objects are thereby initially segregated by size.

16 Claims, 3 Drawing Sheets

LIVE BOTTOM SHEAR DECK REFUSE BAG OPENER

FIELD OF THE INVENTION

The present invention relates to recycling equipment in general and, more particularly, to such equipment which treats refuse contained in bags.

BACKGROUND OF THE INVENTION

Dumping or burning of solid refuse has become an unattractive option for most cities, towns, and villages. In order to make recycling easier and thereby effectively stem the steady flow of refuse into incinerators, landfills, and waterways, many municipalities and waste management companies have embraced alternatives to dumping or burning refuse. Refuse recycling as an alternative to refuse dumping and incineration has gained widespread popularity.

In order to save time, money, and manpower during the recycling process, municipalities have urged their citizens to help clean up the environment and battle the waste disposal problem by sorting their own refuse into recyclable and non-recyclable items before collection. Nonetheless, often recyclable and non-recyclable wastes will be combined in a common receptacle. Thousands of tons of potentially recyclable materials are still routinely buried, burned or dumped into the sea along with biodegradable and non-recyclable waste. More economical and efficient refuse processing methods may allow recycling to reduce levels of refuse consigned to landfills or incinerators.

Much household and business refuse today is collected in plastic refuse bags which are secured in various fashions and then left for pick-up to be trucked to refuse processing plants. For consumer convenience and health reasons, these plastic bags are deliberately structurally engineered to forego degradation and tearing. Moreover, because refuse contained within the plastic bags is often very sharp and inflexible, refuse bags are designed to stretch or to tear slightly to prevent further propagation. Therefore, because plastic refuse bags are designed to resist breakage, the refuse bags are difficult to open during processing, and thus complicate the entire recycling process.

Additionally, the process of collecting, loading and unloading the refuse bags, breaking the bags open, and sorting and separating the refuse manually into recyclable and non-recyclable materials is an unpleasant and time-consuming task.

In the past, if municipal refuse was processed at waste processing facilities at all, it was normally shredded or pulverized in hammer mills or similar devices. The shredding and pulverizing machines generally left a compact, useless mixture of recyclable and non-recyclable material ready only for the incinerator or the landfill. Some conventional bag breaking devices and recycling machines currently being used in the industry, roughly cut, gouge, and tear open refuse bags breaking and destroying glass containers and other potentially recyclable material within, thus contaminating the remainder of the refuse flow and creating more unusable wastes. Additionally, many modern bag breaking devices often have complex moving parts and shafts that may become tangled and wrapped with bags, cloth, wire, or rope or clogged with refuse and eventually become inoperative. Further, the sorting of recyclable and non-recyclable goods typically requires the aid of manual labor.

What is needed is a simple, economical, low maintenance, and efficient device to aid in the sorting and separating of refuse that minimizes the possibility for damage to the potentially recyclable contents within the refuse bag.

SUMMARY OF THE INVENTION

The refuse bag opening apparatus of this invention has an inclined deck which supports adjacent counter-rotating chains to which are mounted triangular blades. Refuse bags are fed onto the deck and are punctured by the blades and the refuse is discharged onto the deck. The blades are thin and triangular-shaped and are tapered to push up recyclable containers instead of shearing them as adjacent sets of pass one another. Some segregation of refuse on the basis of size is achieved by driving the upwardly moving blades at a speed greater than the downwardly moving blades, and by spacing the chains from one another to define a width of refuse article which will not be engaged by the blades and will slide or roll off the deck. Larger items will be driven up the inclined deck and discharged separately from small items.

It is a feature of the present invention to provide an apparatus for efficiently and economically opening refuse bags and processing the refuse within the bags.

It is another feature of the present invention to provide a simple, low maintenance, and inexpensive apparatus for opening refuse bags.

It is an additional feature of the present invention to provide an apparatus that minimizes rotating parts and which is not easily clogged or jammed by loose refuse.

It is yet another feature of the present invention to provide an apparatus that mechanically meters the flow of small and large objects to aid in separating and sorting.

It is a further feature of the present invention to provide an apparatus for opening refuse bags that opens refuse bags with minimum damage to the recyclable items contained within the bags.

Further objects, features and advantages of the invention will be apparent from the following detailed description when taken in conjunction with the accompanying drawings.

DESCRIPTION OF THE PREFERRED EMBODIMENTS

Figure 1:
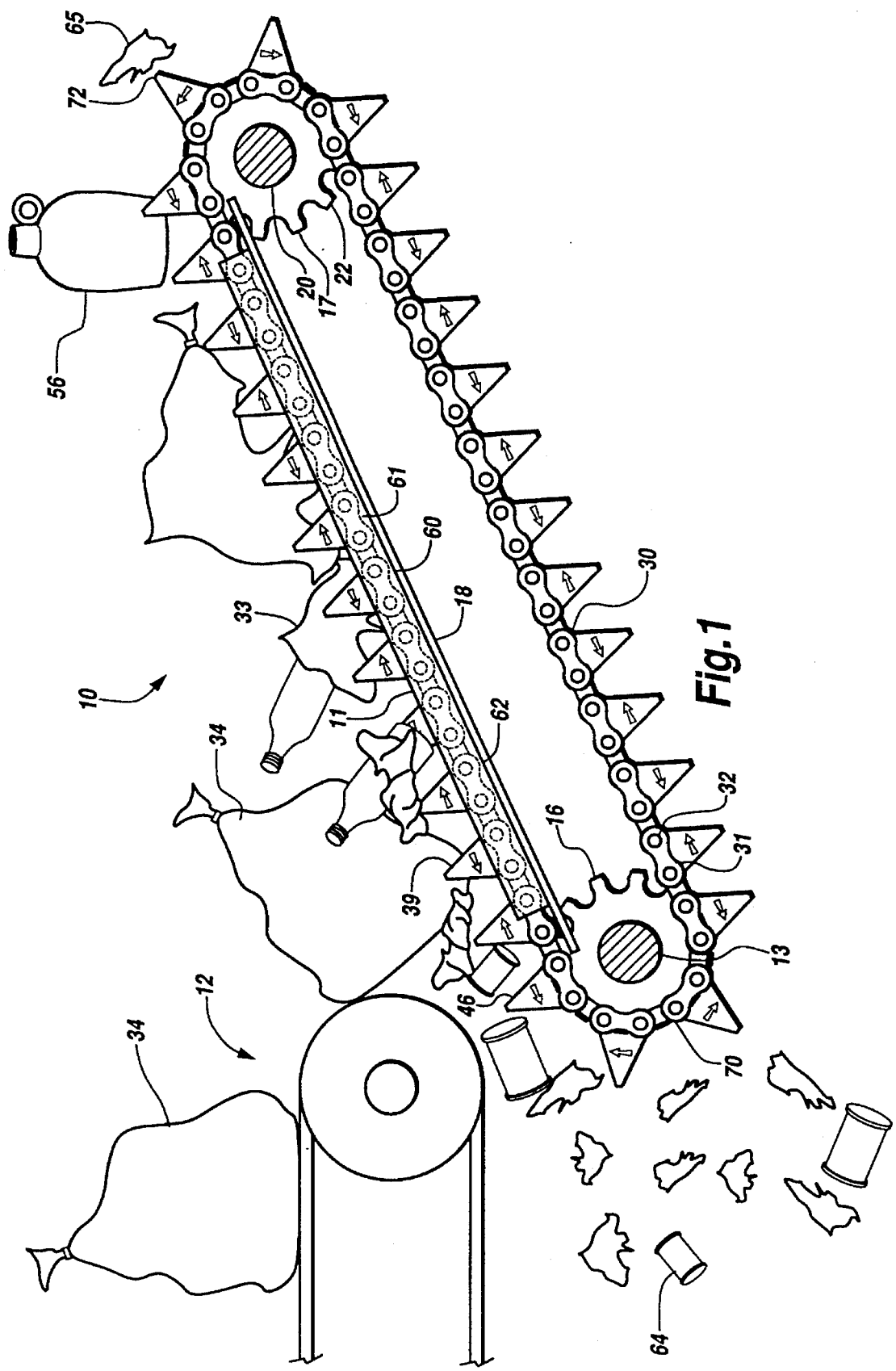
FIG. 1 is a side elevational view of the bag breaking apparatus of this invention.
Figure 2:
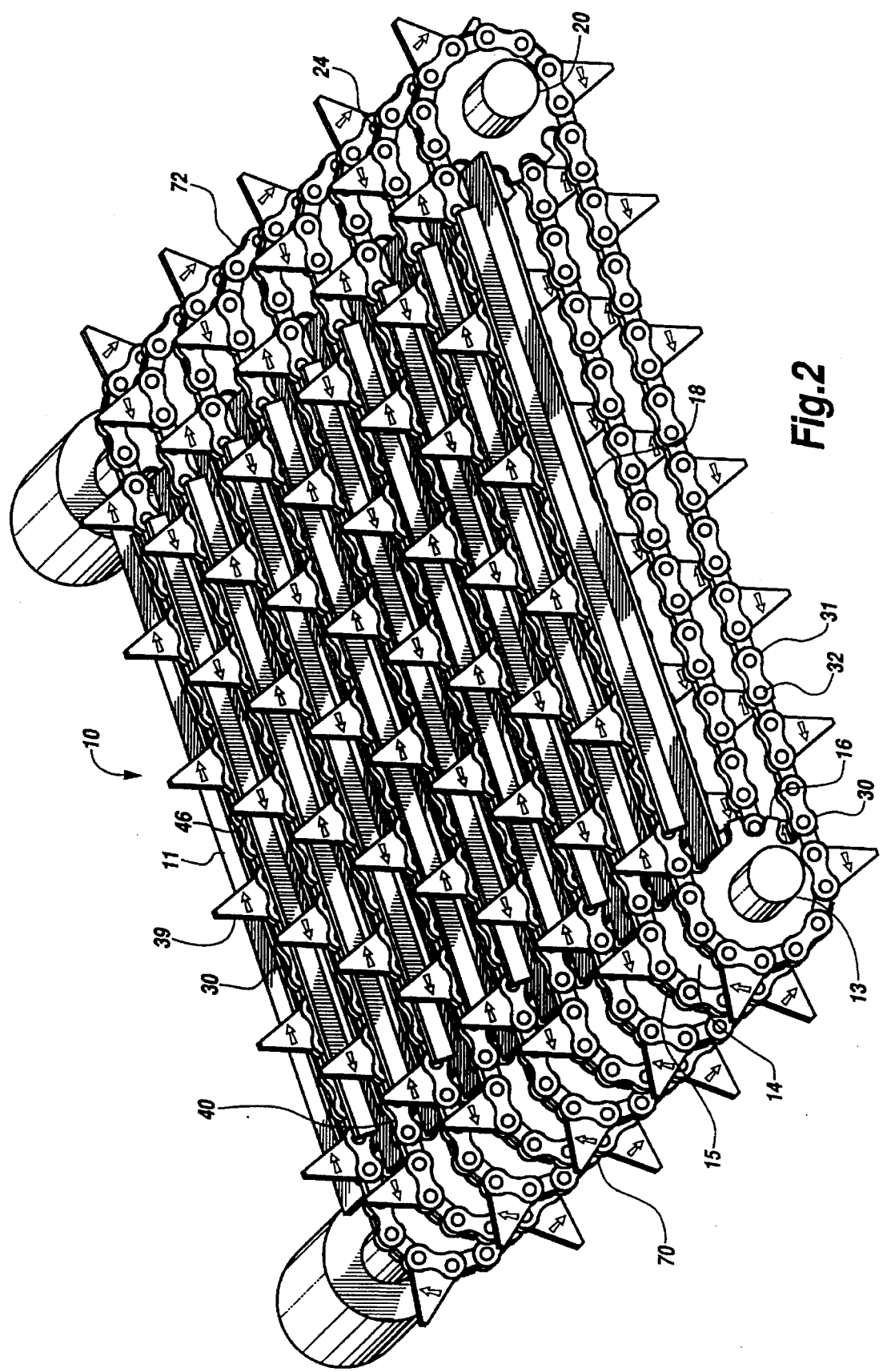
FIG. 2 is an axonometric view of the apparatus of FIG. 1.
Figure 3:
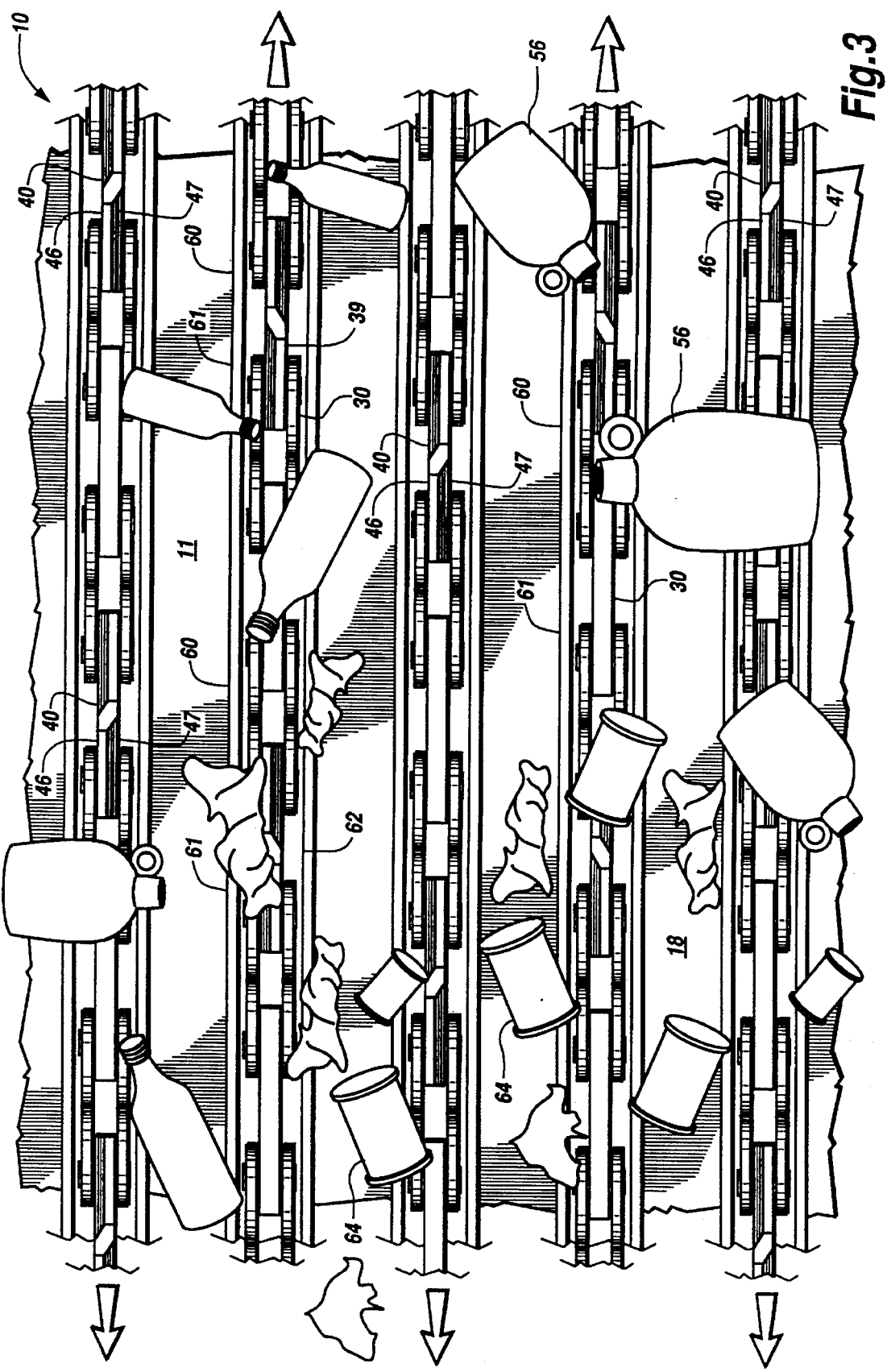
FIG. 3 is a fragmentary top plan view of the shear deck of the apparatus of FIG. 1.

Referring more particularly to FIGS. 1–3, wherein like numbers refer to similar parts, a refuse bag opening apparatus 10 is shown in FIG. 1. The apparatus 10 has an inclined live bottom upper shear deck 11 for tearing open refuse bags 34. The shear deck 11 has an inclined metal plate 18 to which are mounted parallel spaced UHMW channels which guide a plurality of countermoving chains 30, 40 which support upwardly extending blades. The continually moving blades 39, 46 burst open refuse bags, and advance upward larger-sized refuse 56, while smaller refuse items 64 slide down the plate 18, providing a preliminary sorting of refuse on the basis of size.

The refuse bags 34 are fed to the shear deck from a refuse bag infeed 12. The refuse bag infeed 12 may be a belt conveyor, a chain conveyor, an infeed chute, or any appropriate conveying device.

The shear deck 11 is preferably mounted at an incline with a front drive shaft 13 located at the bottom of the incline and a rear drive shaft 20 located at the top of the incline. Bags 34 are discharged onto the shear deck 11 at the base of the inclined plate 18, and are driven upward by the moving blades.

The front shaft 13 rotates to move the first chain loops 30 downwardly. The front drive shaft 13 extends through a plurality of metal or composite drive sprockets 14 and idler sprockets 16. The sprockets 14, 16 have a series of sprocket teeth 15 which engage the chain links of the chain loops 30. The front idler sprockets 16 are alternately mounted with the front drive sprockets 14 along the length of the front drive shaft 13.

The drive sprockets 14 are fixed or keyed to the drive shaft 13, while the idler sprockets 16 are mounted to the drive shaft 13 so that they do not turn when the drive shaft rotates. For example, the idler sprockets 16 may rotate on roller bearings. The bearings absorb the directional motion of the drive shaft 13 without transferring it, thus allowing the idler sprockets 16 to spin freely.

The rear drive shaft 20 rotates to advance a second set of chain loops upwardly. Rear drive sprockets 22 and rear idler sprockets 24 with teeth 17 are mounted to the rear drive shaft 20. The rear drive sprockets 22, are directly connected to the rear drive shaft 20, while the rear idler sprockets turn freely on the rear drive shaft 20.

The rear idler sprockets 24 are alternately mounted with the rear drive sprockets 22 along the length of the rear drive shaft 20. Each front drive sprocket 14 is aligned directly across from a rear idler sprocket 24. Similarly, each rear drive sprocket 22 is aligned directly across from a front idler sprocket 16. Every idler sprocket is paired with a corresponding drive sprocket on the drive shaft opposite it.

The first chain loops 30 are looped around the front drive sprockets 14 and the rear idler sprockets 24. Each chain loop 30 is preferably a metal or composite chain made up of a plurality of chain links 31 and small cylindrical pins 32 connected to form an endless, oval loop.

The second set of looped chains 40 are engaged with the rear drive sprockets 22 and the front idler sprockets 16 and travel upwardly along the deck plate 18.

Generally triangular blades 39, 46, are mounted to each chain 30, 40. The blades 39, 46 serve to pierce and rip open refuse bags processed on the shear deck 11. In order to ensure that each bag is torn open, it is preferred that the blades 39, 46 are mounted to every other link 31 in the chain loops 30, 40. Each blade 39, 46, as shown in FIG. 3, has a beveled edge 47 on the side which approaches a blade moving in an opposite directions. The beveled edges 47 reduce the likelihood that large objects that extend between a blade moving up and a blade moving down will be sheared into multiple pieces. It is more desirable that such an object be tilted or twisted to be ejected from the shear deck intact.

The blades 39, 46 are thin and triangular-shaped and may be either flat or pointed at the peak. The triangular shape of the blades 39, 46 is purposely designed to not break large items 56, in particular recyclable items such as glass containers. Further, the blades 39, 46 are preferably smooth and have minimal surface area to prevent refuse from clinging to the blades.

The loops 30, 40 are positioned on the deck plate 18 by the parallel channel guides 60 which are preferably manufactured from Ultra High Molecular Weight (UHMW) polyethylene plastic or the like. This material is available under the trade name CADCO® from Cadillac Plastic and Chemical Company located in Memphis, Tenn., at 1310 Spring Brook Road, and at other service centers throughout the United States and in foreign countries. The channel guides 60 are generally U-shaped and have two sides 61 which extend upwardly from a base 62.

The deck plate 18 is mounted to a positionable frame along with the drive shafts 13, 20. The entire frame is preferably tiltable by a hydraulic actuator or linkage (not shown) to permit the adjustment of the incline of the deck plate 18.

After the bags 34 have been thoroughly torn open and the refuse has been scattered out on the shear deck 11, the refuse 33 may exit at the front 70 of the apparatus or at the rear 72.

Paper and plastic refuse bags 34 of various shapes and sizes arrive at the refuse processing plant and are loaded onto the refuse bag infeed device 12. As the refuse bags 34 enter the apparatus 10 and fall off the refuse infeed device 12, they drop onto the shear deck 11.

Once the refuse bags 34 fall onto the shear deck 11, the refuse bags are immediately punctured and impaled from below by the sharpened blades 39, 46 mounted to the chain loops 30, 40. As the blades 39 from the first set of chains 30 move in one direction, the blades 46 from the adjacent second set of chains 40 move in the opposite direction, creating a shearing action on the shear deck 11. The shearing action of the blades 39 moving in one direction and the blades 46 moving in the other direction tears the bags 34 open.

When the bags 34 are torn open, the refuse 33 within falls out on the shear deck 11. The blades 39, 46 continuously slice at the bag 34. The bevelled edges 47 on the sides of the triangular-shaped blades 39, 46 are designed to not shear blunt objects when the blades 39 pass by the blades 46 mounted on the adjacent chain loop 40 moving in the opposite direction, as shown in FIG. 3. To promote the upward motion of larger objects, the rear drive shaft 20 rotates more rapidly than the front drive shaft 13. The triangular shape of the blades 39, 46, results in large items 56 which are caught between counter-moving blades being pushed upwardly out from between the blades. The fact that the upward blades are moving faster than the downward moving blades will tend to cause larger items to travel preferentially upwardly.

Portions of refuse which become adhered to the blades or the chains 30, 40 will tend to drop off the apparatus 10 as the chains rotate beneath the shear deck 11.

The speed differential of the chain loops 30, 40 tends to push larger refuse items 56 toward the top and rear of the apparatus 10 where the items are discharged to a collector or conveyor (not shown). Torn pieces of bags 65 will also for the most part be discharged at the top rear 72 of the deck 11. Smaller refuse items 64 which do not extend the distance between adjacent chains, will slide or roll down the deck plate 18 to the foot of the shear deck where they are discharged to a separate conveyor or collector (not shown).

It is understood that the invention is not limited to the particular construction and arrangement of parts herein illustrated and described, but embraces such modified forms thereof as come within the scope of the following claims.

I claim:

1. An apparatus for opening refuse bags to discharge refuse contained therein, the apparatus comprising:

a garbage bag infeed;

a deck defining an inclined plane, the deck in receiving relation to the bag infeed;

a plurality of first chain guides mounted to the deck;

a plurality of second chain guides mounted to the deck substantially parallel to the first set of chain guides and spaced between the first guides;

a plurality of first chains which move in an upward direction along the deck in the first chain guides, the first chains forming endless loops about the deck, wherein each first chain has a plurality of links and a plurality of outwardly extending blades; and a plurality of second chains which move in a downward direction along the deck in the second chain guides, the second chains forming endless loops about the deck, wherein each second chain has a plurality of links and a plurality of outwardly extending blades; and wherein the first and second chain guides are spaced apart less than the width of a refuse bag so the blades on the first and second chains moving in the first and second guides rend a refuse bag when it is fed to the deck by the infeed.

2. The apparatus of claim 1 further comprising:

a first drive shaft having a plurality of first and second drive sprockets, wherein the first sprockets are keyed to the first shaft and drive the first chains, and wherein the second sprockets idle on the shaft and support the second chains in nondriving relation on the first shaft; and a second drive shaft having a plurality of first and second drive sprockets, wherein the second sprockets of the second drive shaft are keyed to the second shaft and drive the second chains, and wherein the first sprockets of the second drive shaft idle on the second shaft and support the first chains in nondriving relation on the second shaft, and wherein the first and second drive shafts are driven in opposite directions.

3. The apparatus of claim 1 wherein the blades are triangular and define a base and an apex and wherein the blade base is positioned closest to the deck and the apex extends away from the deck.

4. The apparatus of claim 1 wherein the first and second chain guides have U-shaped cross sections.

5. The apparatus of claim 1 wherein the chain guides are made of Ultra-High Molecular Weight polyethylene.

6. The apparatus of claim 1 wherein the blades are narrow generally triangular plates, wherein the blades have angled sides such that when two blades pass by one another, objects caught therebetween will tend to be ejected from the blades rather than sheared.

7. The apparatus of claim 1 wherein the first blades are driven upwardly at a speed greater than the second blades are driven downwardly.

8. The apparatus of claim 1 wherein the chain guides are spaced from one another to define sections of the deck between chain guides which extend downwardly, such that smaller refuse items received on said deck sections will be channeled downwardly and thereby separated from larger refuse items carried by the blades upwardly.

9. An apparatus for breaking refuse bags comprising:

a deck inclined from the horizontal to define a lower inlet end and an elevated discharge end;

a plurality of looped first chains mounted to travel over the deck;

a plurality of upwardly protruding first blades connected to the first chains;

means for driving the first chains in unison to advance the connected blades upwardly along the deck;

a plurality of looped second chains mounted to travel over the deck, wherein the second chains run parallel to the first chains;

a plurality of upwardly protruding second blades connected to the second chains; and means for driving the second chains in unison along the deck independently of the first chains, wherein the first and second blades are driven past one another to rend refuse bags positioned on the deck, and wherein the upwardly moving first blades advance refuse to the discharge end of the deck, and wherein refuse not engaged by the blades may escape from the inlet end of the deck.

10. The apparatus of claim 9 wherein the blades are triangular and define a base and an apex and wherein the blade base is positioned closest to the deck and the apex extends away from the deck.

11. The apparatus of claim 9 wherein the means for driving the first and second chains comprises:

a first drive shaft having a plurality of first and second drive sprockets, wherein the first sprockets are keyed to the first shaft and drive the first chains, and wherein the second sprockets idle on the shaft and support the second chains in nondriving relation on the first drive shaft; and a second drive shaft having a plurality of first and second drive sprockets, wherein the second sprockets of the second drive shaft are keyed to the second shaft and drive the second chains, and wherein the first sprockets of the second drive shaft idle on the second drive shaft and support the first chains in nondriving relation on the second drive shaft, and wherein the first and second drive shafts are driven in opposite directions.

12. The apparatus of claim 9 further comprising a plurality of upwardly open chain guides connected to the deck, wherein each chain travels within a chain guide.

13. The apparatus of claim 12 wherein the chain guides have a U-shaped cross section.

14. The apparatus of claim 12 wherein the chain guides are made of Ultra-High Molecular Weight polyethylene.

15. The apparatus of claim 12 wherein the chain guides are spaced from one another to define sections of the deck between chain guides which extend downwardly, such that smaller refuse items received on said deck sections will be channelled downwardly and thereby separated from larger refuse items carried by the blades upwardly.

16. The apparatus of claim 9 wherein the first blades are driven upwardly and the second blades are driven downwardly.

* * * * *